(No Model.)
C. S. BRADLEY.
ELECTRIC MOTOR.
No. 488,305. Patented Dec. 20, 1892.
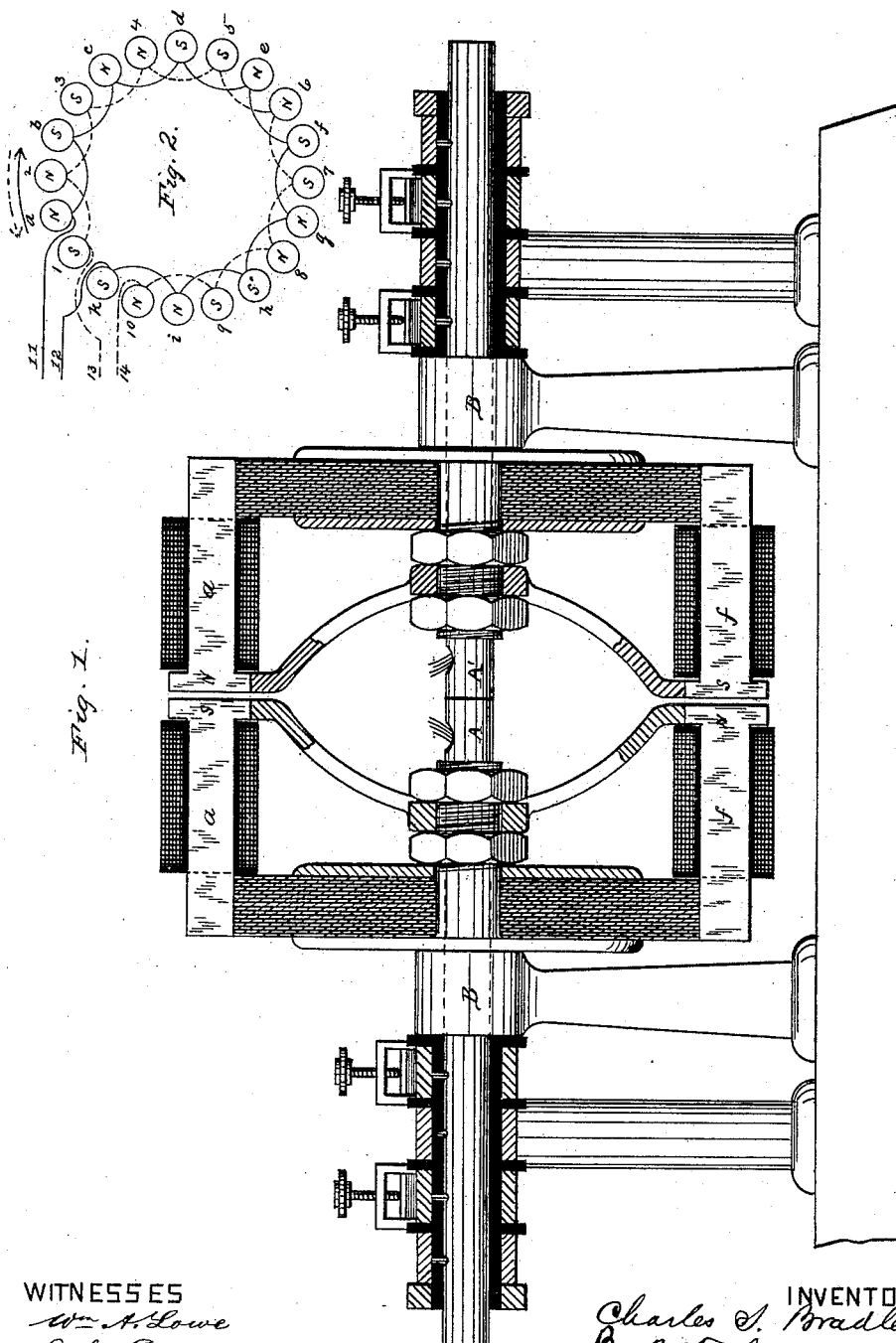
WITNESSES
Wm A. Lowe
J. C. Spaeth
INVENTOR
Charles S. Bradley
By McTighe & Worthington
Attorneys.

UNITED STATES PATENT OFFICE.

CHARLES S. BRADLEY, OF YONKERS, NEW YORK.

ELECTRIC MOTOR.

SPECIFICATION forming part of Letters Patent No. 488,305, dated December 20, 1892.

Application filed June 23, 1890. Serial No. 356,366. (No model.)

*To all whom it may concern:*

Be it known that I, CHARLES S. BRADLEY, a citizen of the United States, residing at Yonkers, in the county of Westchester and State of New York, have invented certain new and useful Improvements in Electric Motors; and I do hereby declare the following to be a full, clear, and exact description of the invention, such as will enable others skilled in the art to which it appertains to make and use the same.

This invention relates to the construction of electric motors for operation by alternating currents, being applied to that class of electric motors which require to be energized by means of two alternating currents differing in their time periods.

The invention consists in the construction and combination of parts substantially as hereinafter fully described and claimed.

In the accompanying drawings which form part of this specification Figure 1 is a longitudinal vertical section of a practical form of the invention; Fig. 2 is a diagram illustrating the arrangement of circuits on one of the revolving parts, each of the two revolving parts being a counterpart of the other in this and all other respects.

The machine has two revolving parts each made up of a number of cores provided with a winding in any of the usual forms of electro-magnet, but I prefer to arrange them in the form of a crown with the free poles all extending in one direction and the radial yokes serving to mechanically connect the same to the shaft. Of course, on account of the use of alternating currents, it is desirable to laminate the cores and yokes to as great a degree as practicable. Two such crowns are attached to two separate shafts A A' which are arranged in line with each other and the crowns brought with their free poles facing each other in as close proximity as mechanical practice will permit in such construction. The shafts are supported in suitable bearings B and as a means of preventing the attraction of the crowns into contact the shafts may be permitted to have their ends bearing against each other. Such bearing may be lubricated if desired. Each crown will consist of an even number of electro-magnets, such that on dividing by two the quotient will also be an even number.

A convenient arrangement will be that represented in Fig. 2, where I have shown the crown to consist of twenty magnets, which are arranged as follows: The alternating magnets $a\ b\ c\ d\ e\ f\ g\ h\ i\ k$ are connected up to form one series in circuit with the supply circuit 11 12 of one alternating current, such complete circuit being indicated in the diagram by full lines. The magnets $a\ b\ c\ $ &c. are so relatively connected into this circuit that at any one moment the polarities alternate; that is to say, when magnet $a$ has at its free end a north pole, magnet $b$ will at its free end have a south pole. The intermediate magnets 1, 2, 3, 4, 5, 6, 7, 8, 9 and 10 are connected up to form another series, which is placed in connection with the other external circuit 13 14, which is supplied with a separate alternating current whose time period differs from that circulating in the circuit 11 12 in this particular instance, to the extent of one-fourth of a phase or wave length. In this second or intermediate circuit the individual magnets are connected up similarly to each other in series so as to make the poles alternate in character. Obviously, on the passage of two alternating currents thus differing in their time periods, a polar wave will be set up in the crown and traverse the crown from right to left or from left to right, according to which of the alternating currents lags behind the other. Assuming the direction indicated in full lines by the arrow in Fig. 2, it will be evident that if the other crown constituting the motor and constructed similarly to the crown shown in Fig. 2 were not supplied with current, but were to be considered as merely so many poles, attraction would be set up with a tendency to move the crown shown in Fig. 2 in the direction opposite that of the movement of the polar wave, that is, the crown would tend to move in the direction shown by the dotted arrow until it came to a stop with the members of the two crowns opposite each other. The same functions would be performed in the other crown but in opposite directions relatively to those indicated in Fig. 2, that is to say, the polar wave set up in the respective crowns would be in opposite directions and therefore the mechanical motion set up by the attractions due to the currents will cause the two crowns to mechanically move in opposite directions. The reactions above described, owing to the multiplicity of poles and the arrangement shown, effect what may be termed a multiple resultant, that is to say, instead of there being a single polar wave traversing each of the crowns in relatively opposite directions, there will be a number of polar waves, according to the number of pairs of poles of which each crown is constituted, and consequently on account of the possibility of getting a considerable radial leverage it is possible that a comparatively small weight will obtain a very powerful motor which shall have a moderate speed at synchronism.

I claim as my invention:

1. An alternating current motor having its two members adapted to rotate in opposite directions, each member being provided with a differential phase winding such that a relative shifting of the magnetic poles will be effected upon connection with a circuit supplying differential phase currents.

2. An alternating current electric motor composed of two oppositely rotating members, each member comprising a circular series of electro-magnets suitably mounted upon a shaft and divided into two separate circuits such that the magnets in one circuit alternate in position with those in the other circuit, and means for connecting the motor circuits with the supply circuits.

In testimony whereof I affix my signature in presence of two witnesses.

CHARLES S. BRADLEY.

Witnesses:
T. J. McTIGHE,
E. C. GRIGG.